UNITED STATES PATENT OFFICE.

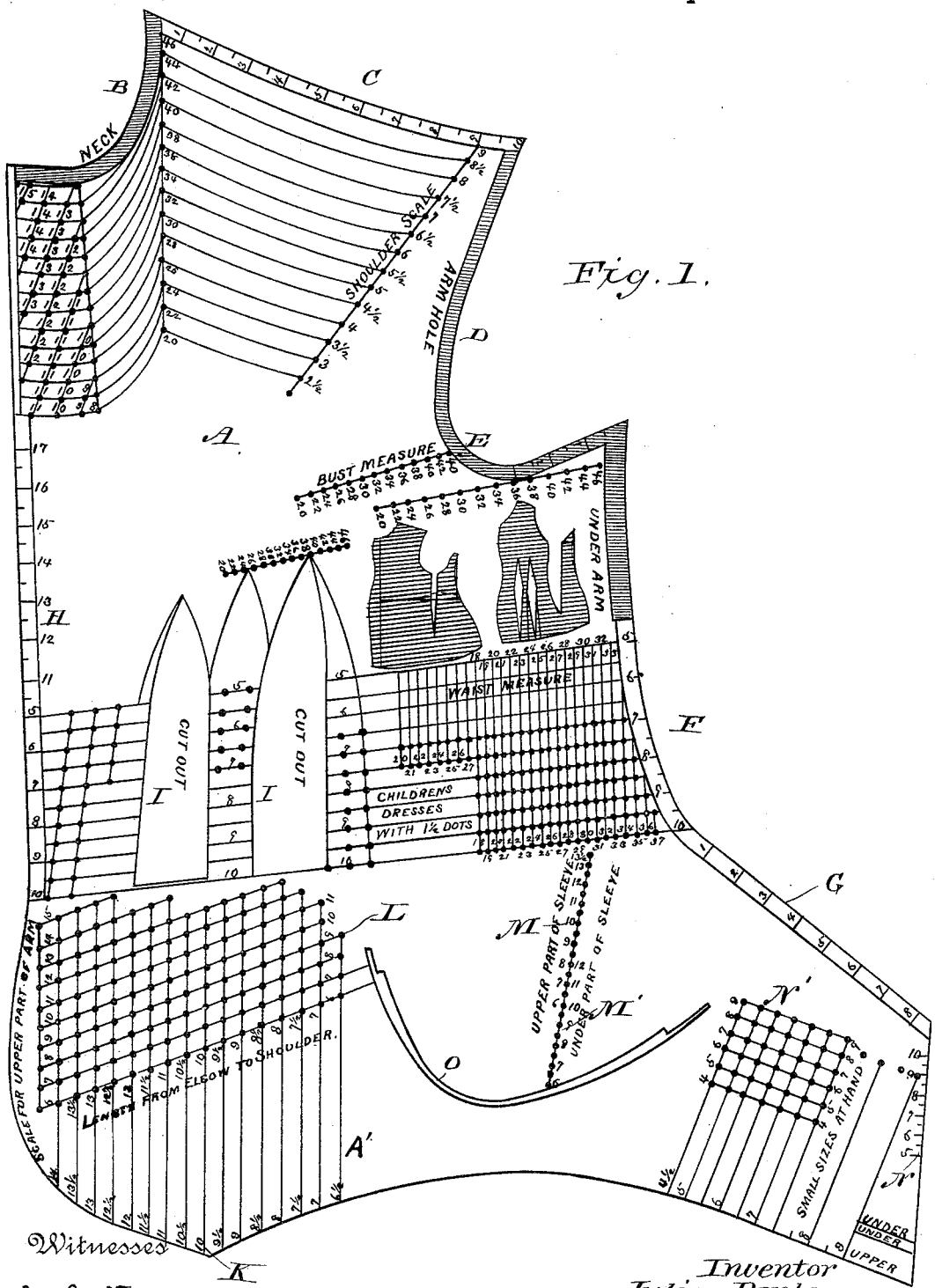

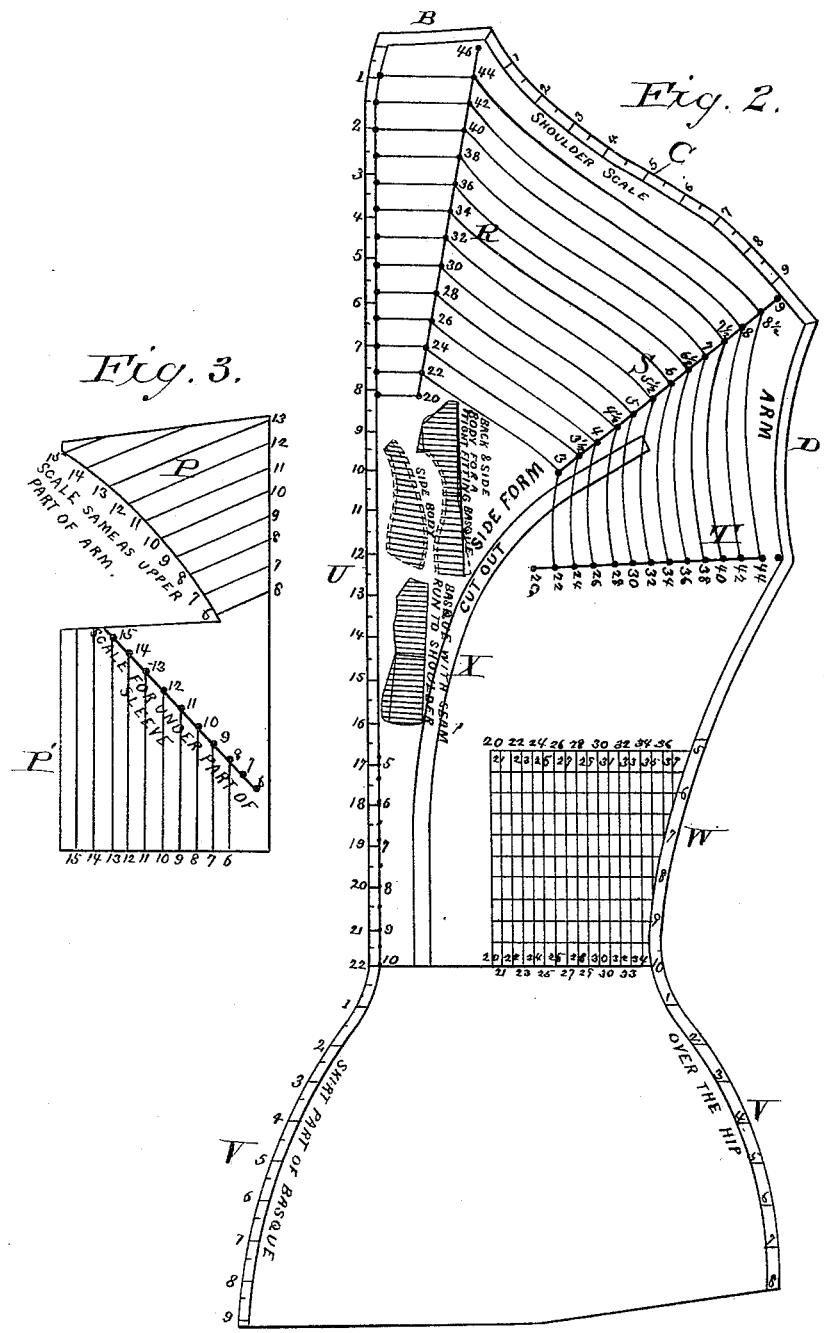

JULIA PENLEY, OF PORTLAND, MAINE.

DRESS-CHART.

SPECIFICATION forming part of Letters Patent No. 410,695, dated September 10, 1889.

Application filed March 13, 1889. Serial No. 303,167. (No model.)

*To all whom it may concern:*

Be it known that I, JULIA PENLEY, of Portland, county of Cumberland, and State of Maine, have invented new and useful Improvements in Dress-Charts, of which the following is a specification.

My invention consists in an improved chart for cutting out dress-patterns. It is adapted to enable any one of ordinary intelligence to prepare from simple measurements a pattern for a woman or child of any usual size.

The general features of the chart herein illustrated and described are shown in United States Patent No. 337,016; but there are certain improvements contained in this which I will clearly point out in the description, and succinctly specify in my claims.

In the accompanying drawings, Figure 1 illustrates the front, side, and sleeve chart; Fig. 2, the back, and Fig. 3 that for fitting the upper end of the under part of the sleeve.

Referring to the letters on the drawings, A indicates the front and side of the chart, and A' the sleeve part.

B indicates the neck-scale, and C the shoulder-scale. The former consists of a series of intersecting lines and numbers at the intersections of said lines, and is provided with connecting-lines between the numerals on scales B and C, respectively, whereby, when the measurement of the neck of a given garment has been obtained and laid off on the neck-scale, the number on the shoulder-scale connected thereto indicates the proper shoulder-measure for the garment.

D indicates the armhole, and E the bust-measures. F indicates the waist-measure, G the skirt part, H the scale for the front part of the garment, and I the waist-gores.

The above description applies to the front and back part of the chart wherever the letters occur.

In the back part U indicates the middle back-seam scale, and W the back waist-scale. V indicates the scale for the skirt part of a basque.

In the sleeve part A' the perpendicular lines K indicate the scale of measurement for laying off the length of arm from elbow to shoulder. The measurement around the arm is laid off at the intersection of one of these lines with one of the lines L, which cross said scale-lines K at an oblique angle. The combination of the said lines K and L form the scale for obtaining the upper part of the sleeve-pattern.

M indicates a scale at elbow for the upper part of sleeve, and M' that for the lower part.

N indicates a scale at hand for large sizes— that is, adult persons—and N' that for smaller sizes.

O indicates a curve for the top of the upper part and under part of sleeves.

Fig. 3 shows a chart which is intended to be used in combination with the scale A' to obtain the extreme point of the upper end of the under part of the sleeve of a garment. It is composed of two sections P P', graduated, in the usual manner, by numbers. The numerals on the scale P correspond with those on the scale A', and the numerals on the scale P' correspond with similar numbers on the scale P. In using this portion of my chart, when a certain measurement has been obtained and laid off by number on the scale A', the scale P is applied by its corresponding number to the said number on scale A', across the upper end of the sleeve, and thereupon the same numeral on the scale P' indicates the required point.

To understand clearly the use of my chart, let it be borne in mind that the chart itself is to be used as a scale from which to obtain different patterns, and that in each individual case a particular pattern is to be laid off from the chart. In the accompanying drawings, the scales are numbered or graduated in the usual manner, and at points where the numbers are located are placed dots, which in use indicate perforations. To begin with the front and side part of the chart, let it be assumed that the measure over the chest from the neck is 34 and the neck measure 12. I then make a dot at 34 on the dividing-line between the scale B and C. Then following the line of the neck, which sets out from 34, I find the perforation 12 on the neck-scale, and there place another dot. I also follow the line from 34 in the opposite direction to the dot at the end of it, which is in this case 6, and there make a dot. Next I obtain the bust-measure, and connect the measures so found with the dot 6, using the contour of the armhole D for the armhole in every garment. I then find the length of the waist under the arm, and mark it off by its appropriate dot on the perpendicular lines of the waist-measure F. The front gores and the basque-scale will be readily understood, as they do not differ from the scales shown in my above-referred-to patent.

The back part of chart is similar to that in the said patent, and is shown here chiefly to indicate the relation of the parts to the whole, and for the sake of illustrating the parallel lines of the neck, shoulder, and arm scales, which I have adopted as being of considerable advantage in practice; but these I do not claim to possess patentable novelty.

In the foregoing description of the front and side part of the chart the chief novelty, and that upon which I base my invention in this regard, is the neck-scale.

Coming now to the scale for the sleeve, suppose the measurement from the elbow to shoulder is fourteen inches. This length is indicated in the scale K by the perpendicular line 14. Now, assuming that the measurement around the arm is twelve inches, I make a dot at the intersection of the line 12 of the scale L and 14 of the scale K. Then ascertaining the measurement around the elbow to be ten, I make a dot from the scale M at 10 and a dot from the scale M' at 10. These points are in the outside line of the upper and under part of the sleeve, respectively.

I next find the measurement around the hand, and assuming that it is six, I make a dot at 6 in the scale N. Having laid off the inside lines of the two parts of the sleeve by the curve in the lower part of the chart, (shown in Fig. 1,) I connect the dot first above obtained with the dot 10 in the scale M and the latter with the dot 6, using the front line H for a guide. This gives me the outside lines of the upper part of the sleeve. Then from the dot at shoulder I lay off a straight line perpendicular to the line from shoulder to elbow. Upon this I apply the scale shown in Fig. 3. Taking the dot at 12 on the perpendicular line in the said scale, I place it upon the dot first before obtained and make the perpendicular line of scale in Fig. 3 conform with the straight line across the top of the sleeve. I then make a dot from 12 on the oblique line in the scale P'. This gives me the extreme point in the outside line of the under part of the sleeve. This I connect with the dot 10 obtained from the scale M', and the latter I connect with the dot indicating the measurement at the hand. I then apply the curve O along the dots obtained from the scales K, L, and P', and draw the top curve of the under part of the arm. Reversing the curve O, I connect the outside lines of the upper part of the arm to obtain the top curve of the same.

In cutting I allow seams all around.

What I claim, and desire to secure by Letters Patent of the United States, is—

1. In a dress-chart, the combination of a shoulder-scale C, graduated by numbers thereon, a neck-scale B, the latter being composed of a series of intersecting lines and numbers at the intersections of said lines, and connecting-lines between the numerals on scale B and C, whereby a measurement of the neck of a garment being laid off by number on the neck-scale, the number on the shoulder-scale connected thereto indicates the proper shoulder-measure, substantially as set forth.

2. The combination, with the sleeve-scale A', of the separate scales P P', said scales being graduated by numbers, the numerals on the scale P corresponding with those on the scale A', and the numerals on the scale P' corresponding with similar numbers on the scale P, whereby, when a certain number on the scale P is applied in the manner set forth in the specification to its equivalent number, said number having been ascertained by measurement, the same numeral on the scale P' indicates the extreme point of the upper end of the under part of a dress-sleeve, substantially as set forth.

In testimony of all which I have hereunto subscribed my name.

JULIA PENLEY.

Witnesses:
BYRON D. VERRILL,
O. H. McALPINE.